(No Model.)
W. P. HARRISON.
Chain Pump Bucket.
No. 231,566.        Patented Aug. 24, 1880.
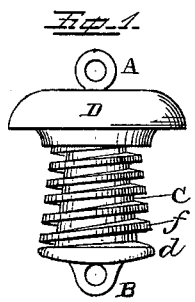
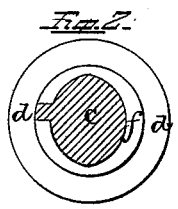
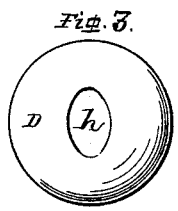
Witnesses
W. W. Mortimer
C. H. Isham
Inventor
Wm. P. Harrison,
per
F. A. Lehmann, Atty.

UNITED STATES PATENT OFFICE.

WILLIAM P. HARRISON, OF WARREN, OHIO.

CHAIN-PUMP BUCKET.

SPECIFICATION forming part of Letters Patent No. 231,566, dated August 24, 1880.

Application filed May 21, 1880. (No model.)

*To all whom it may concern:*

Be it known that I, WILLIAM P. HARRISON, of Warren, in the county of Trumbull and State of Ohio, have invented certain new and useful Improvements in Chain-Pump Buckets; and I do hereby declare the following to be a full, clear, and exact description of the invention, such as will enable others skilled in the art to which it pertains to make and use it, reference being had to the accompanying drawings, which form part of this specification.

My invention relates to an improvement in chain-pump buckets; and it consists in making the shank of the link oval in contradistinction to round, and providing this oval part with a screw-thread, so as to screw the rubber disk upon it, whereby the disk is prevented from turning backward upon the shank while the pump is in operation, as will be more fully described hereinafter.

The accompanying drawings represent my invention.

Figure 1 is a side elevation of my invention, and Fig. 2 is a horizontal section. Fig. 3 is a plan view of the rubber alone.

A and B represent the upper and lower links of the bucket, connected by the shank C and cast in one piece. Ascending from the flange at the base $d$, the shank gradually diminishes in diameter into a cone. Around the cone or shank C winds a screw-thread, $f$, that follows the shape of the cone and terminates at the upper link, A.

The shank, although conical in the aggregate, presents, in a transverse section between the screw-thread, as shown in Fig. 2, a form approaching an ellipse, or, more properly speaking, of two arcs intersecting each other at two places, the intersections of which project beyond the diameters of the intermediate sides. The screw-thread preserves outwardly a uniform conical form, but is diminished in depth at the points of intersection of the arcs. This form of the shank has preferably been adopted to create a check to the rubber disk when screwed down to prevent its turning back while the pump is in operation; but any other form producing the same effect may be substituted.

The rubber disk D is solid throughout, convex on top, flat at the bottom near its outer rim, and toward the center increasing in thickness.

In the center of the disk is an opening, $h$, in which a mother-screw is formed, especially adapted to the form of the shank and also to the screw-thread. The elliptical part of the mother-screw, when the disk is passed over the link A and screwed down, fills the land between the screw-thread and prevents the turning of the disk without force being applied for that purpose.

When the disk becomes worn off at its edge, and consequently the bucket ceases to operate, it is necessary to increase its diameter until it again closes the tube, and to attain this the disk is simply screwed down a turn or half a turn, when the enlarged form of the conical shank restores its lost dimension.

The operation is so simple that any one can perform it, and the necessity of removing the chain from the links in order to re-enlarge the buckets when reduced in size is entirely removed.

I am aware that a conical round shank provided with a screw-thread is old, and this is disclaimed.

Having thus described my invention, I claim—

In a chain-pump bucket, the conical screw-threaded shank C, which shank is oval in cross-section, whereby the rubber disk is prevented from turning backward while the pump is in operation, substantially as shown.

In testimony that I claim the foregoing I have hereunto set my hand this 23d day of April, 1880.

WILLIAM P. HARRISON.

Witnesses:
W. W. MORTIMER,
C. H. ISHAM.